United States Patent [19]
Whelan et al.

[11] 3,761,655
[45] Sept. 25, 1973

[54] SWITCH ACTUATING BOURDON TUBE WITH MOUNTING BOLT PROVIDING FLUID COMMUNICATION BETWEEN PRESSURE SOURCE AND BOURDON TUBE

[75] Inventors: James E. Whelan; George W. Jackson, both of Dayton, Ohio

[73] Assignee: General Motors Corporation, Detroit, Mich.

[22] Filed: Nov. 29, 1972

[21] Appl. No.: 310,599

[52] U.S. Cl. ............ 200/81.8, 73/418, 280/150 AB
[51] Int. Cl... H01h 35/36, G12b 01/04, G01l 07/04
[58] Field of Search.................... 200/81.8; 73/411, 73/418; 280/150 AB; 137/558

[56] References Cited
UNITED STATES PATENTS

| | | | |
|---|---|---|---|
| 1,217,440 | 2/1917 | Gray | 200/81.8 |
| 1,902,998 | 3/1933 | Hans | 73/418 |
| 3,603,153 | 9/1971 | Schmaus | 73/418 |
| 3,638,964 | 2/1972 | Chute | 280/150 AB |

Primary Examiner—Robert K. Schaefer
Assistant Examiner—Robert A. Vanderhye
Attorney—W. E. Finken et al.

[57] ABSTRACT

A low pressure indicator switch assembly for a pressure vessel of a vehicle air cushion restraint system which includes a body member with a threaded passage communicating with the interior of the pressure vessel. A Bourdon tube has an orificed end portion. A mounting bolt with a threaded shank extends through the orificed end portion and into the threaded passage of the body member to mount the end portion of the Bourdon tube to the body member. The threaded shank of the mounting bolt and the threaded passage of the pressure vessel define therebetween a passage for communicating pressure between the pressure vessel and the Bourdon tube. The assembly further includes contact means which is adapted to be connected with a warning device which is operatively controlled by the Bourdon tube for actuating the warning device when the pressure of the pressure vessel is below a predetermined pressure.

3 Claims, 6 Drawing Figures

Fig. 2

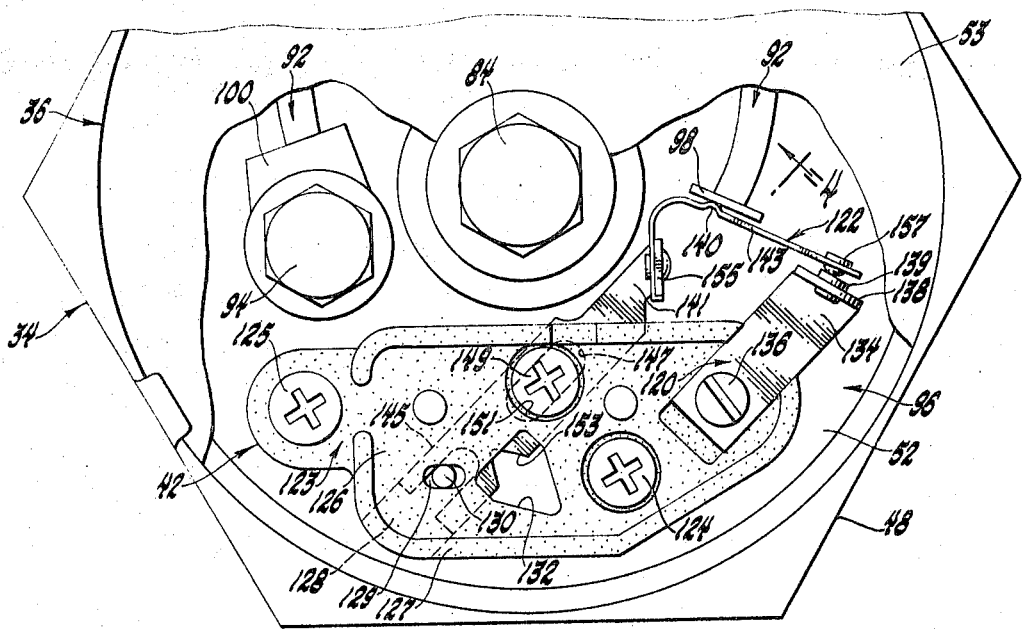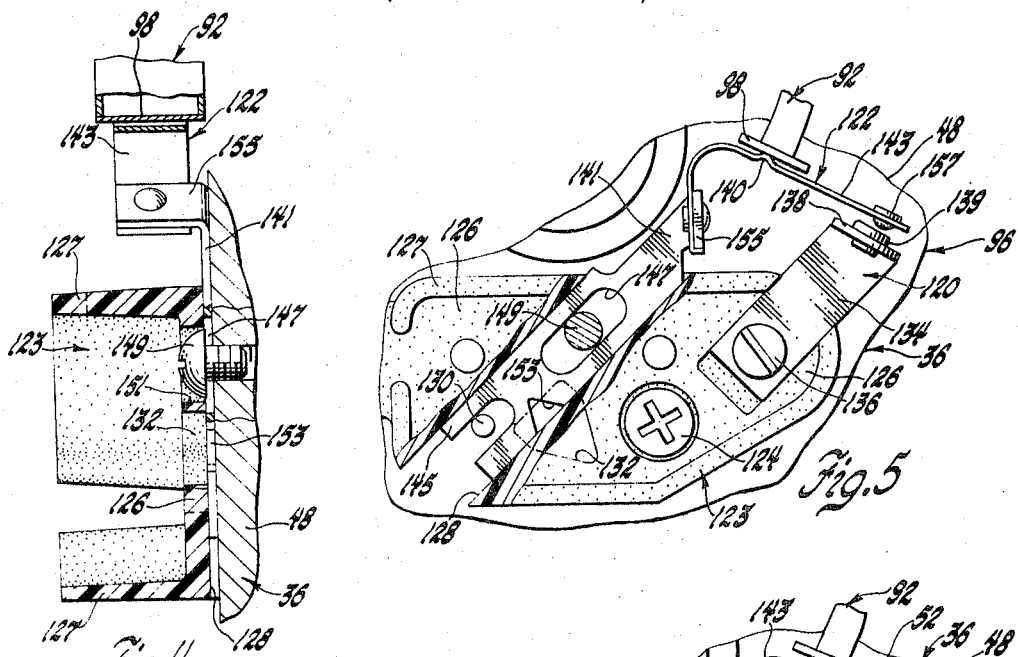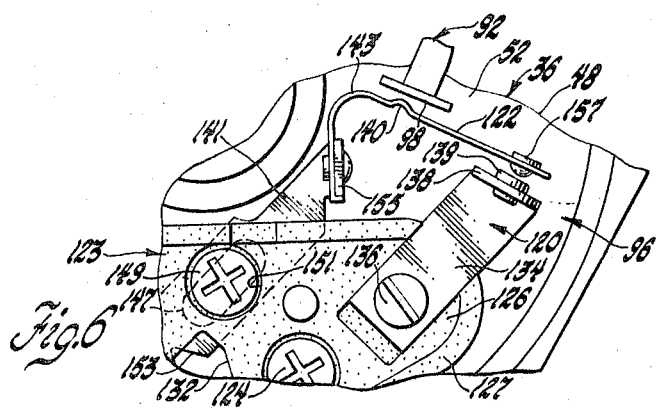

SWITCH ACTUATING BOURDON TUBE WITH MOUNTING BOLT PROVIDING FLUID COMMUNICATION BETWEEN PRESSURE SOURCE AND BOURDON TUBE

The present invention relates to pressure vessels for vehicle air cushion restraint systems, and, more particularly, to a low pressure indicator switch assembly for such pressure vessels.

The pressure vessels of vehicle air cushion restraint systems have heretofore been provided with valve assemblies having an inlet valve to provide for pressurization of the pressure vessel and a pressure relief valve to prevent the pressure of the pressure vessel from exceeding a predetermined maximum. Similarly, it is desirable that indicating means be provided for the pressure vessels of vehicle air cushion restraint systems to provide a warning when the pressure of the pressure vessel decreases to below a predetermined, desirable minimum. One desirable type of low pressure indicator consists of a Bourdon tube which responds to the low pressure condition of the pressure vessel to close a switch and actuate a warning device, such as a light. In this respect, pressure indicator devices for pressure vessels and comprising switch actuating Bourdon tubes have many times heretofore been provided.

In a preferred embodiment, the low pressure indicator switch assembly of the present invention comprises a body member which has a threaded passage communicating with a pressure vessel. The assembly has a Bourdon tube with an orificed end portion and a mounting bolt with a threaded shank which extends through the orificed end portion and is received within the passage of the body member to mount the end portion of the Bourdon tube to the body member. The threaded shank of the mounting bolt and the threaded passage of the pressure vessel have different thread depths and define therebetween a passage for communicating pressure between the pressure vessel and the Bourdon tube. The switch assembly further having contact means which is adapted to be connected with a warning device and which is operatively controlled by the Bourdon tube for actuating the warning device when the pressure of the pressure vessel is below a predetermined minimum.

In the drawings:

FIG. 3 is a partially broken away end elevational view of FIG. 2;

FIG. 4 is a cross-sectional view taken along line 4—4 of FIG. 3;

FIG. 5 is a view similar to FIG. 3 but with different portions removed and with different parts in different positions; and FIG. 6 is another view similar to FIG. 3 but with different parts in different positions.

Figure 1:
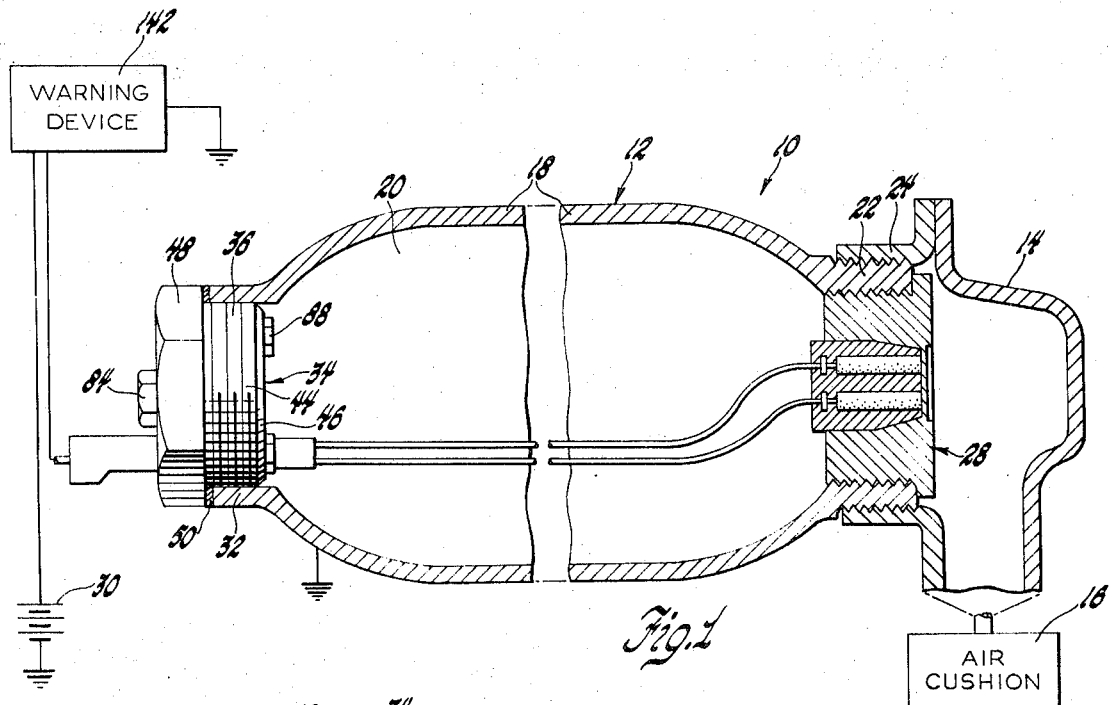
FIG. 1 shows a vehicle air cushion restraint system embodying the present invention with portions shown schematically and with other portions shown in cross-sectional elevation.

As representing the preferred embodiment of the present invention, the drawings show a vehicle air cushion restraint system 10 which includes a pressure vessel 12 which is connected by a manifold 14 to inflatable air cushions 16 within the passenger compartment of a vehicle (not shown). The pressure vessel 12 is generally cylindrical in shape and has a continuous wall 18 partially defining an inner chamber or interior 20 which contains air, nitrogen, or other suitable fluid at a pressure of approximately 3,500 PSI. The pressure vessel 12 has a first open end defined by a cylindrical, axially extending flange 22. The flange 22 is externally threaded for cooperative engagement with a complementarily threaded flange 24 of the manifold 14. The cylindrical flange 22 is also internally threaded and cooperatively engaged with a complementarily threaded detonator assembly 28 which normally closes the open end of the vessel 12. The detonator assembly 28 is suitably connected to a power source or battery 30 and is energized in response to a signal from a inertia sensing device (not shown) of the vehicle air cushion restraint system 10 to provide for the pressurized fluid of the pressure vessel 12 to escape therefrom and pass into the manifold 14 to inflate and deploy the air cushions 16. The pressure vessel 12 has a second open end defined by another cylindrical, internally threaded, and axially extending flange 32 opposite the first open end.

The cylindrical, axially extending flange 32 has received therein the valve and indicator assembly 34 which embodies the present invention and which broadly comprises a body member 36, an inlet valve 38, a pressure relief valve 40, and a low pressure indicator switch 42.

Figure 2:
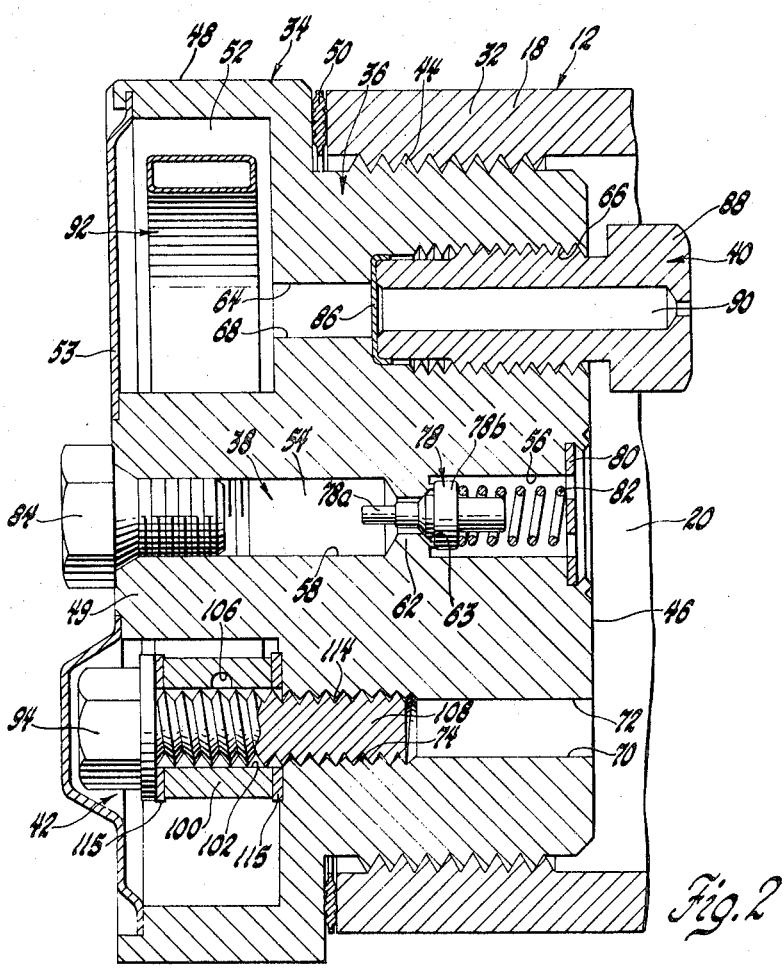
FIG. 2 is an enlarged cross-sectional view of a portion of FIG. 1.

Referring to FIG. 2, the body member 36 of the valve and indicator assembly 34 has an externally threaded shank portion 44 which is cooperatively received within the threaded flange 32 of the pressure vessel 12. In this respect, the body member 36 has an inner end or portion 46 exposed and communicating with the inner chamber 20 of the pressure vessel 12. Now referring to FIGS. 2 and 3, the body member 36 also includes an outer hexagonal head portion 48 which abuts the end of the flange 32 of pressure vessel 12. A ribbed sealing washer 50 is positioned between the head portion 48 and the flange 32 to seal the connection therebetween. The head portion 48 also has a ring-like or toroidal recess 52 which serves purposes later described in greater detail. The recess 52 is normally covered by a plate 53 which is retained in place by crimping a flange of the head portion 48 over the outer periphery of the plate 53.

The body member 36 has an inlet valve bore 54 which extends axially therethrough and which has a first portion 56 adjacent the inner end 46 of the body member 36, a second portion 58 adjacent the outer end 49 of the body member 36, and a third portion of a lesser diameter than the first and second portions 56 and 58 and which is defined by a cylindrical, annular shoulder 62. The shoulder 62 defines, on one side thereof, an inwardly tapering valve seat 63. The body member 36 also has an axially extending pressure relief valve bore 64 which includes a threaded first portion 66 and a second portion 68 of smaller diameter than the first portion 66 and which opens to the base wall of the recess 52. The body member 36 further includes an axially extending third bore or passage 70 which has a first portion 72 adjacent the inner end 46 and a second threaded portion 74 which opens to the base wall of the recess 52. The threaded portion 74 of the opening 70 has a first thread depth and a first thread pitch.

Still referring to FIG. 2, the inlet valve 38 of the valve and indicator assembly 34 comprises a valve element 78 which is positioned within the inlet bore 54. The valve element 78 has a stem 78a with a head 78b centrally located upon the stem 78a and which has one side tapered for complementary engagement with the valve seat 63 of the shoulder 62. An apertured washer 80 is staked across the first portion 56 of the inlet valve bore 54 immediately adjacent the inner end 46 of the body member 36 and seats a spring 82 which normally biases the head 78b of the valve element 78 into a sealing and complementary engagement with the valve seat 63 of the shoulder 62 within the bore 54, to prevent communication of the inner chamber 20 of the pressure vessel 12 with the atmosphere.

It should be understood that the inlet valve 38 provides for the pressure vessel 12 to be pressurized by a pressure source when the head 78b of the valve element 78 is displaced from the valve seat 63, against the bias of the spring 82. After the vessel 12 is pressurized, the bore 54 is closed by a bolt 84 which is threadably received within the second portion 58 of the inlet valve bore 54.

The pressure relief valve 40 of the valve and indicator assembly 34 comprises a cup-shaped rupturable diaphragm 86, of and suitable material such as metal or plastic; which is positioned wihtin the first portion 66 of the pressure relief bore 64 and immediately adjacent the second portion 68 and which serves to normally close the pressure relief bore 64. The diaphragm 86 is seated and retained by a bolt 88 threadably received within the first portion 66 of bore 64, and which has a central, counterbored passage 90 communicating the inner chamber 20 of the pressure vessel 12 with the diaphragm 86. It should be understood that the diaphragm 86 ruptures to depressurize the pressure vessel 12 when the pressure of the inner chamber 20 exceeds a predetermined maximum.

The low pressure indicator switch 42 of the valve and indicator assembly 34 broadly comprises a Bourdon tube 92, a mounting bolt 94, and a contact means 96. Referring to FIGS. 2 and 3, the Bourdon tube 92 is of arcuate shape and terminates in a closed free end 98. The Bourdon tube 92 also has a laterally enlarged, flat sided end portion 100 opposite its free end 98. The end portion 100 has an orifice 102 extending normally therethrough. In this respect, the flat sided, orificed end portion 100 of the Bourdon tube 92 is adapted to be mounted to the body member 36 within the recess 52 and adjacent the outer end of the passage 70. Further, the orifice 102 communicates fluidly with the closed free end 98 of the Bourdon tube 92 via a small internal passage 106 in end portion 100. As is well known to those skilled in the art, the Bourdon tube 92, when in communication with a variable pressure source, tends to straighten or unwind with increases in pressure and tends to curl or wind with decreases in pressure.

The threaded shank 108 of bolt 94 has the same thread pitch as the threaded portion 74 within the opening 70 of the body member 36, but it has a second thread depth greater than that of the threaded portion 74. The threaded shank 108 of the bolt 94 extends through the orifice 102 of the end portion 100 of the Bourdon tube 92 and is threadably received within the threaded portion 74 of the body member 36. Thus, the bolt 94 mounts the end portion 100 of the Bourdon tube 92 adjacent the passage 70 and with the orifice 102 axially aligned with the passage 70. Significantly, because of the differences in thread depth, the threaded shank 108 of bolt 94 and the threaded portion 74 define a helical passage 114 therebetween. The helical passage 114 provides for pressure communication between the inner chamber 20 of the pressure vessel 12 and the Bourdon tube 92 via the orifice 102 and the small passage 106. It should also be noted that the shank 108 of the mounting bolt 94 could have the lesser thread depth as this would likewise provide for the helical passage 114 to be defined between the bolt shank 108 and the threaded portion 74 of the passage 70.

Ring-like washers or seals 115 are provided between the head of the bolt 94 and one flat side of the end portion 100 and between the body member 36 and the other flat side of the end portion 100 to seal the communication between the inner chamber 20 of the pressure vessel 12 and the Bourdon tube 92.

With reference to FIGS. 3 through 6, the contact means 96 comprises an L-shaped stationary contact 120 and an adjustable, movable contact 122 which are mounted upon an insulator block 123 which is bolted at 124 and 125 to the body member 36. The insulator block 123, which could be of any suitable material such as plastic, has a flat base 126 with a peripherally extending wall 127. The insulator block 123 also has a transversely extending groove 128 within its base 126 and a slot 129 which opens through the insulator block 123 to the groove 128. The slot 129 has a ground contact pin 130 interferingly received and retained therein which projects into the groove 128. The insulator block 123 also has a triangularly shaped window opening 132 which extends therethrough to expose a portion of the groove 128, as best shown in FIGS. 3-5.

The L-shaped stationary contact 120 has one leg 134 bolted at 136 to the insulator block 123 and extending outwardly from the insulator block 123 through a slot in the wall 127, the other leg 138 mounts a contact 139.

The movable contact 122 comprises an elongated support base 141 which supports a leaf spring 143. The support base 141 is slidably received within the groove 128 of the insulator block 123 and has a bifurcated end 145 which straddles and contacts the ground contact 130. The support base 141 also includes a slot 147. The support base 141 is retained in a desired position within the groove 128 of the insulator block 123 by a bolt 149 which extends through another opening 151 in the block 123 and which is threaded into the base wall of recess 52. The support base 141 also includes a triangular notch 153 which, when the movable contact 122 is assembled to the insulator block 123, is positioned within the window opening 132 to provide for manual adjustment of the position of the support base 141 within the groove 128. The leaf spring 143 of the movable contact 122 is suitably mounted upon an end 155 of the support base 141 which extends outwardly of the groove 128. The leaf spring contact 122 extends between the free end 98 of the Bourdon tube 92 and the stationary contact 120 adjacent which it mounts a contact 157. Through manual adjustment of the positioning of the support base 141 within the groove 128 as was previously described, the leaf spring 143 is positioned relative to the stationary contact 120 and the free end 98 of the Bourdon tube 92 to provide, as shown in FIG. 3, for the free end 98 to engage a fulcrum rib 140 on the leaf spring 143 and to bias the contact 157 of the leaf spring 143 into engagement with the contact 139 of the stationary contact 120 when the pressure of the inner chamber 20 of the pressure vessel 12 decreases below a predetermined minimum. The contacts 120 and 122 are electrically connected with a warning device 142, such as a light or a buzzer, and energize the warning device 142 when they are closed in engagement by the free end 98 of the Bourdon tube 92 to indicate the low pressure condition.

In operation and with the pressure of the inner chamber 20 of the pressure vessel 12 well above the predetermined desirable minimum pressure, the Bourdon tube 92 is sufficiently unwound or straightened that the free end 98 is disengaged from the rib 140 of the leaf spring 143, as shown in FIG. 6. Thus, the contact 157 leaf spring 143 and the contact 139 of the stationary contact 120 are disengaged and the warning device 142 is not energized. With reference to FIG. 5, as the pressure of the inner chamber 20 of the pressure 12 decreased toward the predetermined minimum pressure, the Bourdon tube 92 has a tendency to wind and the free end 98 eventually engages the rib 140 of the leaf spring 143. However, the leaf spring 143 is not as yet biased into engagement with the stationary contact 120 and, therefore, the warning device 142 is not energized. With reference to FIG. 3, as the pressure of the pressure vessel 12 decreases below the desired predetermined pressure, the Bourdon tube 92 continues to wind and the free end 98 biases the leaf contact 143 into engagement with the stationary contact 120 and energizes the warning device 142 to indicate the low pressure condition to the operator of the vehicle.

The foregoing disclosure relates to a preferred embodiment of the subject invention which may be modified within the scope of the appended claims.

What is claimed is:

1. A low pressure indicator switch assembly for a pressure vessel comprising: a body member having a threaded passage means therein communicating with the pressure vessel, a Bourdon tube having an orificed end portion, a mounting bolt having a threaded shank means extending through said orificed end portion and into said threaded passage means to mount said end portion of said Bourdon tube to said body member, said threaded passage means and threaded shank means having different thread depths to define therebetween a helical passage for communicating pressure between the pressure vessel and said Bourdon tube; and contact means adapted to be connected with a warning device and being operatively controlled by said Bourdon tube for actuation of the warning device when the presssure of the pressure vessel is below a predetermined pressure.

2. A low pressure indicator switch assembly for a pressure vessel of a vehicle air cushion restraint system, comprising: a body member having a passage extending therethrough and communicating with the interior of the pressure vessel, said body member having a threaded portion within said passage; a Bourdon tube having one end portion closed and having its other end portion with an orifice extending therethrough; a mounting bolt having a threaded shank extending through said orifice of said other end portion and received within said passage for cooperating with said threaded portion within said passage of said body member to mount said other end portion of said Bourdon tube to said body member, one of said threaded shank of said mounting bolt and said threaded portion having a greater thread depth for a helical passage to be defined between said threaded shank and threaded portion to communicate pressure between the interior of the pressure vessel and said Bourdon tube; and a movable contact and a stationary contact which are adapted to be connected with a warning device, said movable contact being operatively engaged by said Bourdon tube and moved with respect to said stationary contact for actuating the warning device when the pressure of the interior of said pressure vessel is below a predetermined pressure.

3. In a vehicle air cusion restrain system having a detonable pressure vessel, a valve and indicator assembly, comprising: a body member adapted to be sealingly connected with said pressure vessel and having a passage extending therethrough and communicating with the interior of said presssure vessel, said body member having a threaded portion within said passage; inlet valve means and pressure relief valve means associated with said body member; a low pressure indicator switch having a Bourdon tube with a first closed free end and a second end with an orifice extending therethrough, said switch also having a mounting bolt with a threaded shank extending through said orifice of said second end and cooperating with said threaded portion within said passage of said body member to mount said second end of said Bourdon tube to said body member, said threaded shank of said mounting bolt and said threaded portion within said passage of said body member having different thread depths and defining therebetween a helical passage for communicating pressure between the interior of said pressure vessel and said Bourdon tube, said switch having sealing means between the head of said mounting bolt and said second end and between said body portion and said second end; said switch further having contact means mounted to said body member, said contact means having a stationary contact and an adjustable leaf spring contact normally biased out of engagement with said stationary contact, said leaf spring contact being positioned adjacent said free end of said Bourdon tube and being operatively engaged thereby and moved into engagement with said stationary contact when the pressure within said pressure vessel decreases to below a predetermined minimum pressure; and warning device means connected with a said movable and stationary contacts of said switch means and being actuated when said movable contact engages said stationary contact.

* * * * *